United States Patent [19]

Kao et al.

[11] 4,243,298
[45] Jan. 6, 1981

[54] HIGH-STRENGTH OPTICAL PREFORMS AND FIBERS WITH THIN, HIGH-COMPRESSION OUTER LAYERS

[75] Inventors: Charles K. Kao; Mokhtar S. Maklad, both of Roanoke, Va.

[73] Assignee: International Telephone and Telegraph Corporation, New York, N.Y.

[21] Appl. No.: 949,351

[22] Filed: Oct. 6, 1978

Related U.S. Application Data

[63] Continuation-in-part of Ser. No. 807,868, Jun. 20, 1977, abandoned.

[51] Int. Cl.³ .............................................. G02B 5/14
[52] U.S. Cl. ................................ 350/96.33; 350/96.30
[58] Field of Search ................ 350/96.33, 96.29, 96.30

[56] References Cited

U.S. PATENT DOCUMENTS

| 3,227,032 | 1/1966 | Upton | 350/96.29 |
| 3,963,468 | 6/1976 | Jaeger et al. | 350/96.33 |
| 4,089,585 | 5/1978 | Slaughter | 350/96.33 |

FOREIGN PATENT DOCUMENTS

| 80107 | 10/1976 | Australia | 350/96.33 |
| 2615534 | 10/1977 | Fed. Rep. of Germany | 350/96.33 |

OTHER PUBLICATIONS

"Properties of Selected Commercial Glasses" Corning Glass Works, B–83, Corning, N. Y., Sep. 1965.

*Primary Examiner*—Stewart J. Levy
*Attorney, Agent, or Firm*—John T. O'Halloran; Thomas N. Twomey

[57] ABSTRACT

High-strength optical preforms and optical fibers, particularly useful in light-wave communication systems, are fabricated by techniques producing high surface compressive forces in thin outer layers. These result in substantially increased fiber tensile strength, durability, and fiber life. High surface stresses are achieved in three-layer and four-layer preforms and fibers by employing particular combinations of core, cladding, and layer compositions, dopants, coefficients of thermal expansion, and glass transition temperatures.

Various suitable manufacturing methods are disclosed using chemical vapor deposition techniques. For example, preforms may be fabricated by external deposition of layers on a drawn core-glass rod, or by internal CVD methods in which layers are sequentially deposited within hollow tubular silica substrates that are then collapsed into solid preforms by known techniques. In the internal deposition methods, preform finishing techniques are also disclosed for removing excess substrate material so as to leave a high-strength compressive layer of substantially pure silica.

17 Claims, 15 Drawing Figures

| INNER LAYER 14 | EXPANSION COEFFICIENT ($\times 10^{-7}$) | OUTER LAYER 13 | EXPANSION COEFFICIENT ($\times 10^{-7}$) | DIFFERENCE IN EXPANSION ($\times 10^{-7}$) |
|---|---|---|---|---|
| SILICA | (5.5–8.0) | — | — | — |
| BORO-SILICATE | (32–51) | SILICA | (5.5–8.0) | (26.5–43.0) |
| SODA LIME | 92 | BORO-SILICATE | 32–51 | (41.0–60.0) |
| LEAD GLASS | 104 | SODA LIME | 92 | 12 |

HIGH-STRENGTH OPTICAL PREFORMS AND FIBERS WITH THIN, HIGH-COMPRESSION OUTER LAYERS

This application is a continuation-in-part of our copending U.S. patent application Ser. No. 807,868, filed June 20, 1977 now abandoned, which is assigned to the same assignee as the present invention and which is to become abandoned subsequent to the filing of this application.

BACKGROUND OF THE INVENTION

Multilayer drawn glass fibers are of increasing importance for the transmission of light beams over long distances, especially for light-wave communications. To avoid excessive light losses, it is now common practice to form composite drawn fibers having a glass core of one optical index of refraction and a surrounding cladding glass layer of a lower index of refraction. Single-mode fibers may have a core diameter of only a few microns and an outer diameter of core and cladding of from 10 to 100 times greater; whereas multi-mode fibers may have much larger core diameters, e.g., up to 60 microns, and outer cladding diameters up to about 150 microns. The cladding layer is customarily enclosed by one or more layers of a suitable plastic to provide physical protection for the delicate fiber. Even so, problems of low fiber strength, inadequate fiber durability, and short life have remained.

When a tensile force is applied on the linear axis of the fiber, tension in the outer fiber surface increases substantially. Even when precautions are taken to keep dust particles and moisture from the outer surface of the glass fiber structure, as by immediate application of the plastic coating during manufacture, the fiber is usually somewhat abraded and micro-cracks tend to form on the fiber surface. Since an optical communication fiber may be subject to considerable tension, such microcracks propagate readily from the perimeter of the glass surface toward the glass core. In due time the entire fiber becomes substantially weakened and may fracture after a relatively short life that is totally inadequate for communication purposes. The presence of water molecules on the glass perimeter will also enhance crack propagation, increasing the chances of early failure.

One known method of increasing the strength of glass optical communication fibers is to provide surface compression at the cladding surface. Such a technique is discussed, for example, in an article in the Journal of the American Ceramic Society, December 1969, pages 661–664, by D. A. Krohn and A. R. Cooper, then of Case Western Reserve University. This article presents theoretical and experimental data to show that, if the cladding glass is selected to have a lower coefficient of thermal expansion than that of the core glass and if proper attention is paid to glass transition temperatures of the core and cladding, there is a good probability that compressive stresses can be developed to improve fiber strength.

U.S. Pat. No. 3,849,181—Green teaches that certain types of non-optical glass structural fibers, for example high-strength polycrystalline refractory oxide fibers for use in fiber-glass structures, may be strengthened by applying an extremely thin coating of a glassy material to the outer surface of each fiber. However, the patentee is not concerned with problems relating to optical fibers and he specifies that, for these structural fibers, the outer coating must be less than 0.1 micron in thickness. As will become apparent from the detailed description of our invention below, this extremely thin coating would not be effective to provide a satisfactory high-strength optical structure for purposes of our invention.

It has also been previously proposed in general terms to strengthen a composite optical fiber by applying a second sheath over the cladding sheath which has a lower coefficient of thermal expansion than the cladding sheath or of the combination of core and cladding sheath. See for example the German Federal Republic Offenlegungsschrift No. 24 19 786, published Nov. 6, 1975. Reference may also be made to a corresponding English version in Australian Specification No. 493,505, published Oct. 21, 1976. While this is also an advance in the art, it does not teach how to create sufficiently high compressive forces in the outer layer to produce the improved high-strength long-life optical fibers of our invention.

SUMMARY OF THE INVENTION

It is a principal object of our invention to produce improved optical communication fibers, of high light transmission quality suitable for transmission of optical signals without light amplification over long distances up to 10 kilometers or more, characterized by exceptionally long life and higher resistance to tensile and bending stresses, without mechanical damage or failure, than heretofore achieved.

Our invention also relates to novel methods of making such fibers by sequential chemical deposition of various glass layers having special relationships between the layer compositions, layer thicknesses, their coefficients of thermal expansion, and their transition temperatures. The novel methods described herein may be used in making optical preforms possessing superior physical properties, which may then be drawn into long optical fibers by known techniques.

It is broadly an object of our invention to provide such optical preforms and resulting fibers with an outer layer or sheath which is under higher compressive stress than heretofore believed attainable, thereby achieving higher axial strength, resistance to physical damage, and longer fiber life. Such compressive stress may be of the order of 100,000 pounds per square inch (100 kpsi) or more.

In one embodiment of our invention, an optical preform, having a composite core and cladding of relatively high coefficients of thermal expansion and relatively low transition temperatures, is surrounded by a relatively thin outer silica layer having relatively low coefficient of thermal expansion and relatively high transition temperature. When properly processed and cooled, this combination results in a three-layer preform having a compressive stress in the outer layer which may be of the order of 50,000 pounds per square inch (50 kpsi) or more.

In another embodiment of our invention, an intermediate layer of relatively high coefficient of thermal expansion and relatively low transition temperature is interposed between the cladding layer and outer layer of an optical preform which is otherwise essentially similar to the above-described three-layer structure. This technique can produce a four-layer optical preform and resulting optical fiber having even higher surface compressive stress in the outer layer, e.g., 100 kpsi or more.

Our invention also contemplates, in another embodiment, that the thin outer layer may be a glassy layer having a negative coefficient of thermal expansion to create even higher compressive stress in that layer, with resultant higher fiber strength and longer fiber life.

In one method which we employ in making such an improved optical preform, a core glass rod of the required physical characteristics is formed, by well-known chemical vapor deposition techniques, on the end of a rotating mandrel that is slowly moved axially. The several concentric enclosing layers are also concurrently formed on the core rod in a controlled sequence by similar CVD techniques. The coated rod is then sintered in such a manner as to form a solid, prestressed optical preform in accordance with our invention.

In another method which we employ in making such an improved optical preform, the core and surrounding layers are sequentially deposited, again by known CVD techniques, within the bore of a hollow tubular silica substrate, but in inverse order. After the tubular substrate and enclosed layers are collapsed under higher heat, again by known techniques, to form a solid preform with the innermost layer now comprising a solid rod core, the outer substrate layer is substantially removed, by one of several techniques described hereinafter. By proper controls of the layer compositions, thicknesses, and other parameters, we are again able to make an optical preform and resulting fiber having a thin highly-stressed outer layer.

These and other objects and features of our invention will become apparent from the detailed description of the invention set out below.

DETAILED DESCRIPTION OF THE INVENTION

Figure 1:
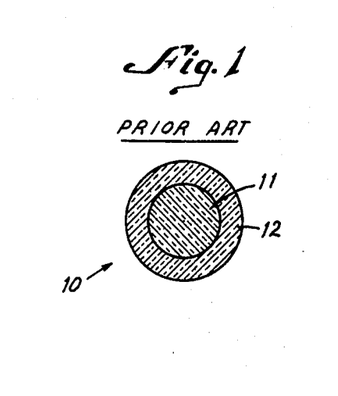
FIG. 1 is a cross-section view of a glass-on-glass optical fiber which is typical of the prior art.
Figure 2:
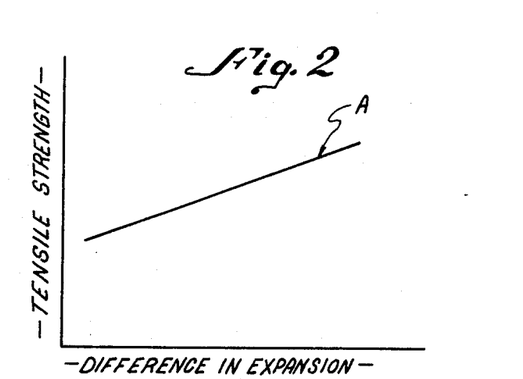
FIG. 2 is a simplified graphic representation of the relationship between the difference in expansion of the outer layer of the fiber of FIG. 1 with respect to its core and the tensile strength of the fiber.

FIG. 1 shows in cross-section a typical two-layer fiber 10 wherein the core 11 generally consists of a doped silica and the cladding layer 12 generally consists of either a silica doped with an index-of-refraction reducing agent or pure silica ($SiO_2$) per se. As is taught by the referenced Krohn and Cooper article, some improvement in fiber tensile strength can be achieved by utilizing a glass material for the cladding layer 12 which has a coefficient of thermal expansion lower than that of the glass material forming the core. As is well-known in the art, the cladding layer 12 also has a lower index of refraction than that of the core 11 in order to obtain the desired light transmission properties. FIG. 2 graphically shows a typical relationship A, not necessarily to any particular scale, between the difference in expansion of the layers 11 and 12 and the resulting increase in tensile strength of the composite fiber.

Figure 3:
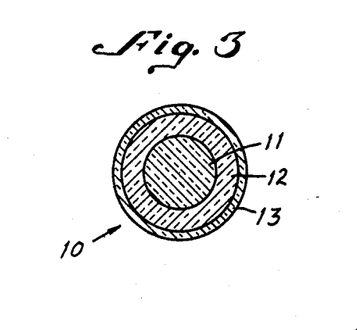
FIG. 3 is a cross-section view of a three-layer optical fiber or preform, not necessarily to scale, which may be formed so as to have high surface compression in accordance with the invention.

Since the coefficient of thermal expansion of pure silica is relatively low, having measured values of 5.5 to $8.0 \times 10^{-7}$ cm./°C., it is somewhat difficult to find compatible materials for the outer layer having significantly lower thermal expansion properties and to apply one such material to the outer surface of the silica layer. FIG. 3 shows a three-layer structure in which an additional layer 13, having a lower coefficient of thermal expansion than that of the cladding layer 12 is applied over the cladding layer. If properly applied, this third layer can substantially increase the compression forces on the surface of the cladding layer which has a greater surface area per unit length than that of the core alone. However, as will be pointed out in greater detail hereinafter, it is also important to select suitable materials for the layers which have the proper glass transition temperatures in order to obtain optimum tensile-strength characteristics. As stated in the above-referenced Krohn and Cooper article, the glass transition temperature $T_g$, as it is commonly called in the art, is that temperature at which the glass material changes from a visco-elastic state to an elastic state as it cools down. More specifically, $T_g$ is often defined as the temperature at which the viscosity of the cooling molten glass reaches $10^{13}$ poises. While this temperature varies somewhat, for any given glass, depending upon the cooling rate, this variation is not significant for the purposes of our invention in view of the widely-differing temperatures $T_g$ which we have found to be effective in practice.

The axial compressive stress produced by an outer compression layer is very important in preventing or reducing surface tension when the composite fiber is subjected to tensile or bending stresses. This in turn reduces stress-induced corrosion and may very substantially increase the fiber life. As an example, if the surface compression on an optical fiber is 100 kpsi, then the fiber will theoretically have infinite durability, insofar as stress-induced damage is concerned, if applied stresses are kept below 100 kpsi. On the other hand, if the applied tensile stresses are increased to 150 kpsi, then for the same fiber, the time to failure is dramatically decreased by a factor of $(\sigma_s/\sigma_s-\sigma_c)^n$ where n is a fatigue parameter which typically lies between 15 and 25 for a fiber having a silica surface. $\sigma_s$ and $\sigma_c$ are the applied and compressive stresses respectively. Hence, in this illustrative example the time to failure would be decreased very significantly. By employing the manufacturing techniques and physical parameters developed in accordance with our invention, we have concluded it is possible to produce optical fibers having surface compression of the order of 100 kpsi or even higher values.

Figure 4:
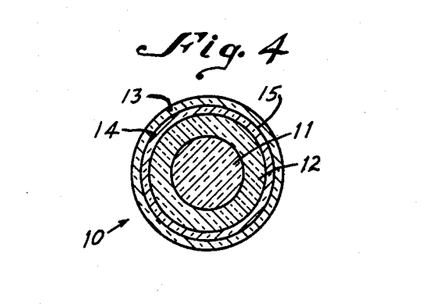
FIG. 4 is a cross-section view of a four-layer optical fiber or preform, also not necessarily to scale, which may also be formed to have high surface compression in accordance with the invention.
Figure 5:
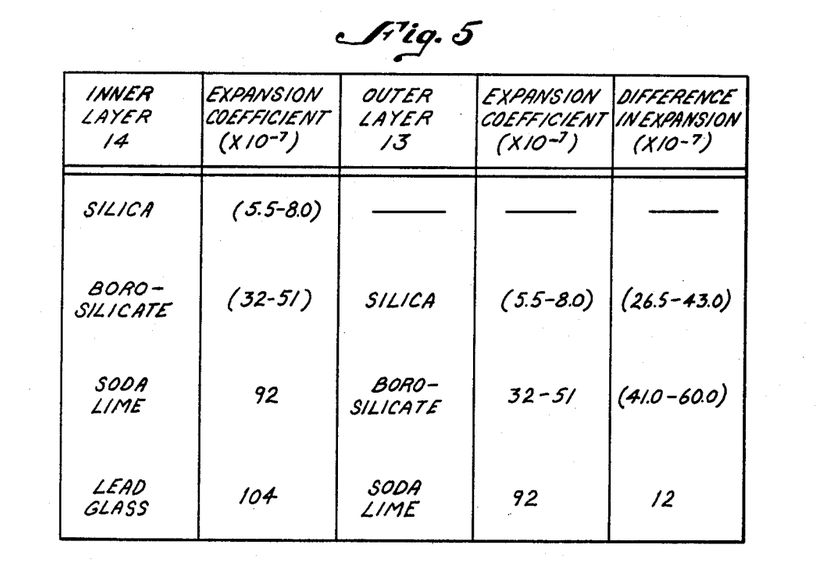
FIG. 5 is a table listing typical expansion coefficients for certain types of glasses that might be used in the two outermost layers of glass in the structure of FIG. 4, together with some differences in expansion coefficients for selected glasses.

FIG. 4 shows another embodiment of an optical fiber 10 having four layers, again not necessarily drawn to scale. This fiber and its preform can have greater strength properties than those of the embodiment of FIG. 3. As illustrated, the fiber 10 not only contains the usual core 11 and cladding 12 but also a next-to-outer layer 14 of material which has a relatively high thermal expansion coefficient. Like the fiber of preform of FIG. 3, this fiber also has an outermost layer 13 of a material which has a relatively low thermal expansion coefficient. When the various materials are properly selected and processed, the compressive stress at the interface 15 between the layers 14 and 13 can be made even higher than the compressive stress due to the layer 13 in the structure of FIG. 3. If the optical core 11 is surrounded by a suitable cladding layer 12 of lower index of refraction, then the outer layers 14 and 13 need not be selected with reference to their optical characteristics but only for their effectiveness in applying desired compressive forces to the composite fiber or preform. FIG. 5 is a table showing various types of glasses which may, for example, be used for the next-to-outer layer 14 and for the outer layer 13 in the structure of FIG. 4. Typical expansion coefficient values are tabulated, together with differences in these values for selected pairs of glasses used for the layers 14 and 13.

Figure 6:
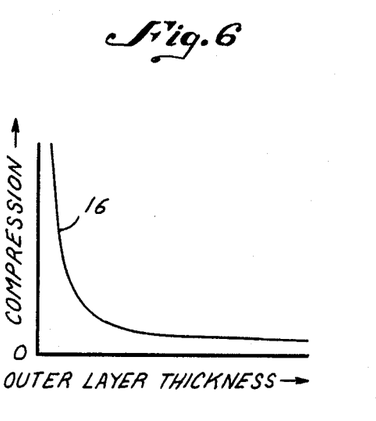
FIG. 6 is a graphic representation of certain tension and compression forces, existing in the improved fibers or preforms of FIGS. 3 and 4, as functions of outer layer thickness.

FIG. 6 is a graphic representation of the relationship between the compressive and tensile forces existing at the interface 15 of the structure of FIG. 4 as functions of outer layer thickness. The compressive force on the outer surface of layer 13 is shown to vary exponentially as a function of outer layer thickness, as represented by the curve 16, becoming asymptotic in value at the interface 15.

Figure 7:
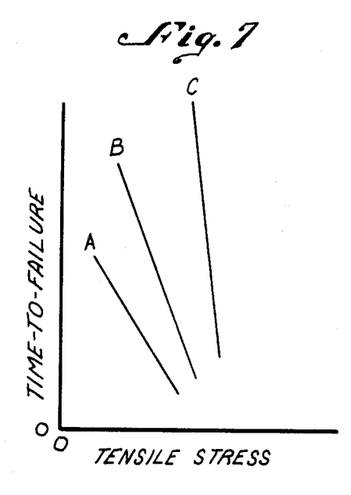
FIG. 7 is a graphic representation of stress versus time-to-failure for certain types of structures formed in accordance with the principles of the invention.

In order to determine the effective increase in tensile strength for optical fibers incorporating outer coatings such as the coatings 14 and 13 of FIG. 4, the time-to-failure as a function of tensile stress applied to the composite fiber is represented schematically in FIG. 7 for three contours of increasing differences of thermal expansion between the materials of layers 14 and 13. The curve A shows schematically that when a relatively small difference exits between the coefficients of thermal expansion of the layers 14 and 13, the fiber will fail in a relatively short period of time for a given applied tensile stress. For a greater difference between their thermal coefficients, the fiber might fail in a manner generally represented by the curve B, and for an even greater difference, in a manner represented by the curve C. It is to be understood that the curves of FIG. 7 are purely exemplary and not drawn to any particular scale; nor are they necessarily linear for any particular case.

The glassy materials listed in FIG. 5 may be preferable for the layers 14 and 13 in FIG. 4 because of the convenience and low manufacturing expense involved in using glass-on-glass coatings for optical fibers. Furthermore, we have found that the surface compression can be substantially increased by carefully controlling the thickness of the relatively thin outer layer and by employing a next-to-outer layer having a higher coefficient of thermal expansion and a lower transition temperature than the corresponding parameters of the outer layer.

Figure 8:
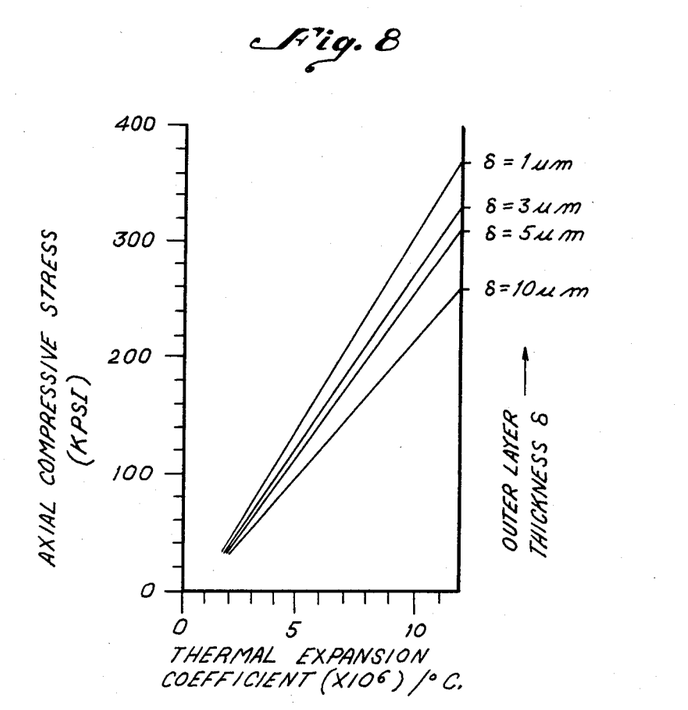
FIG. 8 is an exemplary graph illustrating certain relationships between thermal expansion coefficients and axial compressive stresses of optical fibers having differing outer layer thicknesses.

If silica is selected for the outer layer, surface compression can be calculated for a range of coefficients of thermal expansion of the inner region enclosed by the silica layer. FIG. 8 represents the results of one such set of calculations. This shows the change in axial compressive stress, as a function of the weighted average of the coefficients of thermal expansion of the materials making up the inner region, for four different thicknesses $\delta$ of the outer layer ranging between 1 and 10 microns ($\mu$m.). It will be observed that, for a given thermal expansion coefficient, the axial compressive stress in the fiber increases more rapidly as the outer layer thickness $\delta$ is decreased.

Figure 9:
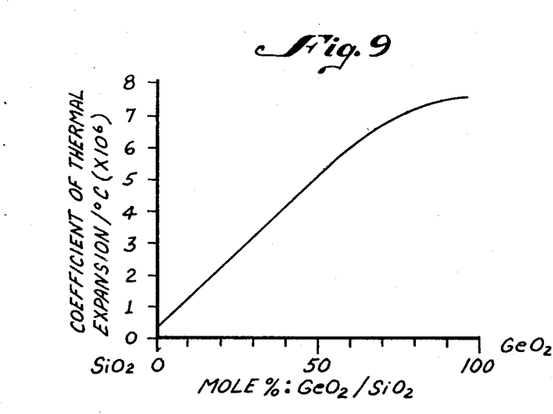
FIGS. 9 and 10 are graphs showing variations in coefficients of linear expansion as a function of the chemical compositions of two types of glasses which may be used in composite optical preforms and fibers embodying the invention.
Figure 10:
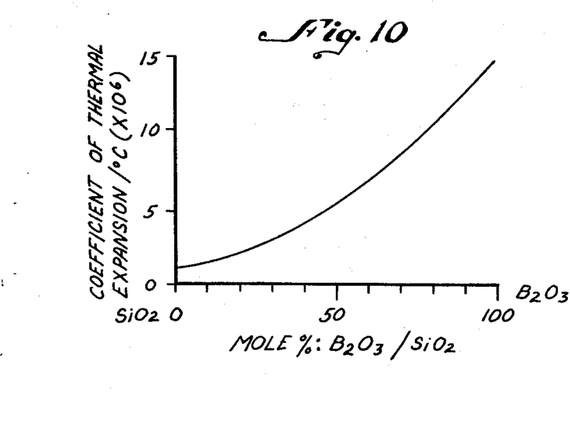

In optical fibers as just described, both the optical indices of refraction and the thermal coefficients of expansion of the core 11 and the cladding layer 12 are affected by the choice of glass compositions. For example, in certain typical optical fibers produced commercially, the core may consist of a $GeO_2/SiO_2$ glass composition and the cladding may consist of a $B_2O_3/SiO_2$ composition. Typical curves of coefficients of thermal expansion as a function of glass composition are shown in FIGS. 9 and 10 for these two types of glasses. Mixtures may also be used.

Thus far, the description of our invention has concentrated largely on the importance of selecting suitable material compositions for the glass core, the cladding, and the outer layer or layers, and on the importance of the relative thicknesses of layers, in achieving a high degree of compressive stress in the thin outer layer. We have also emphasized the known facts that the core and cladding must have appropriate indices of refraction for high-quality optical transmission characteristics of the completed fiber. However, there is also one additional important parameter that should also be emphasized, i.e.: the relationship between the transition temperatures $T_g$ of the core and the several layers. We have found that maximum tensile strength can be achieved by using a thin outer silica compression layer which not only has a lower coefficient of thermal expansion than the enclosed inner portions of the fiber but also has a substantially higher $T_g$. In addition, the outer silica layer preferably also has a substantially higher $T_g$ than the average of the $T_g$'s of the core and the layers forming the inner portion of the composite fiber. Like the indices of refraction and the coefficients of thermal expansion, the transition temperatures $T_g$ are also functions of glass composition, as will shortly be discussed in greater detail.

Several methods for forming the improved optical fiber preforms in accordance with our invention will next be described.

Figure 11:
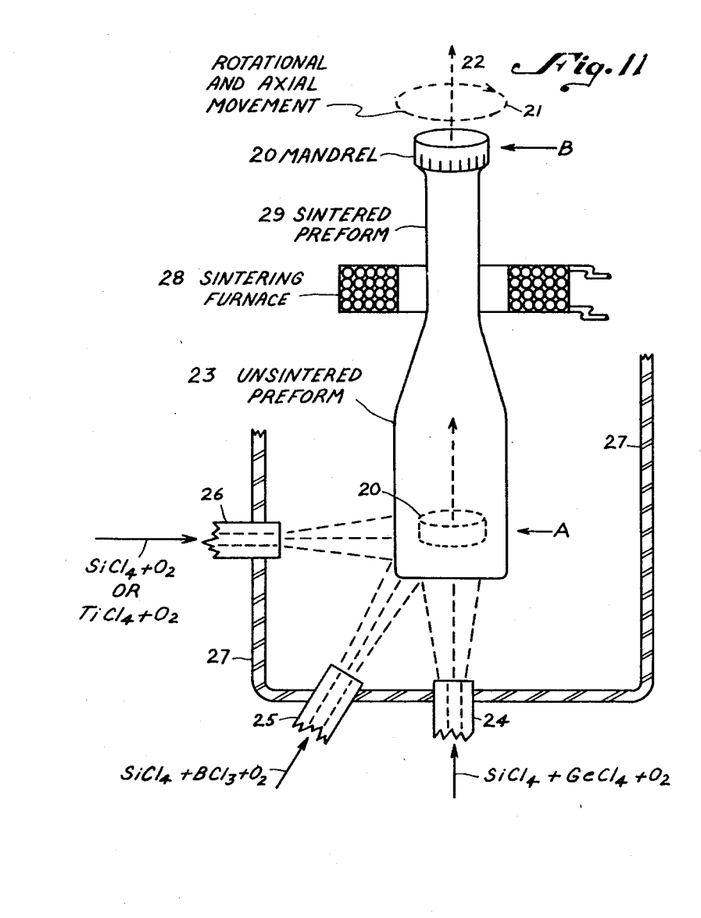
FIG. 11 is a schematic side elevation view, partially in section, showing one method of forming a composite optical preform of the three-layer type in accordance with the principles of the invention.

FIG. 11 shows in schematic cross-section view one arrangement for forming a three-layer preform structure, such as that generally illustrated in FIG. 3, by depositing glassy oxides on the end of a rotating mandrel that is continuously moved axially to create an unsintered preform. This may then be sintered to make the finished preform. The general technique is well-known in the art, being illustrated for example by U.S. Pat. No. 3,957,474—Kobayashi et al, and therefore need not be described in any great detail. Briefly, a mandrel 20 of suitable refractory material is arranged to be rotated and also moved axially upward by suitable means, not shown but simply indicated schematically by the dashed arrows 21 and 22. Assuming that the mandrel starts from a lower position A, as indicated in dashed outline in FIG. 11, and is then moved upward, the core, cladding, and jacketing layers may be deposited in rapid sequence on the end of the mandrel, resulting in the formation of the unsintered preform 23. This is accomplished by deposition of the desired glassy materials from three nozzles 24, 25, and 26 which are oriented to deposit the core, cladding, and outer layer respectively. Each nozzle is associated with a suitable heat source known to the art, such as an oxyhydrogen flame or plasma torch or intense laser beam. At the same time, by using known chemical vapor deposition (CVD) techniques, the compositions and thicknesses of the core and layer materials may be closely controlled. This is accomplished by the introduction of suitable gases and entrained materials to form the desired glass compositions. As indicated in FIG. 11, for example, the core is formed by the introduction of a suitable mixture of silicon tetrachloride and germanium tetrachloride entrained in oxygen and directed against the base of mandrel 20 on its axis, as shown. Similarly, the nozzle 25, which is directed toward a concentric area surrounding the core portion, forms the cladding layer from a suitable mixture of silicon tetrachloride and boron trichloride entrained in oxygen. Finally, the outer compression layer is next deposited on the surface of the unsintered cladding layer by nozzle 26 which projects an oxygen jet with entrained silicon tetrachloride or, optionally, titanium tetrachloride. As illustrated, nozzle 26 is directed substantially at right angle to the preform axis and just above the area of deposition of the cladding layer. To prevent contamination of the unsintered preform section, the nozzles and associated equipment may conventionally be suitably enclosed as by a refractory reaction chamber 27.

As the mandrel continues its upward movement toward the position B in FIG. 11, the unsintered preform section 23 passes through a sintering furnace 28 represented schematically as a toroidal coil energized from a suitable electrical power source, not shown. The unsintered preform section 23 is thereby fused into the finished, sintered preform section 29, of reduced diameter, as the mandrel 20 continues its upward movement. The resultant clear, glassy preform 29 may thereby be formed with the desired layer compositions, thicknesses, and physical parameters, as previously described with reference to the three-layer structure of FIG. 3. The finished preform may be formed to any convenient length, say up to about one meter, and may thereafter be drawn into an optical fiber and coated with protective plastic, as previously mentioned.

In the method illustrated in FIG. 11, the glass compositions and thicknesses may be readily controlled to provide the desired compressive stress in the thin outer layer. The coefficients of thermal expansion and the transition temperatures may be controlled by varying the gas mixtures to produce glasses having characteristics shown by the curves of FIGS. 9 and 10. For example, the germanium silicate core may also include traces of boron or phosphorous, and the compositions and thicknesses of the cladding and outer layers may also be varied. As previously mentioned, the core and cladding layer form the inner portion and should have a substantially higher average coefficient of thermal expansion and substantially lower transition temperatures than those of the relatively thin outer compression layer. As a further alternative, it may be desirable to form the outer layer of a glass having a negative coefficient of thermal expansion, such as an $SiO_2/TiO_2$ glass composition.

The process described with respect to FIG. 11 has the following advantages:

(1) the composition and thickness of each deposited layer can be very accurately controlled;

(2) the thin outer compression layer can be deposited directly without further processing of the outer preform surface, thereby reducing the possibility of preform contamination and the creation of unwanted stresses due to inclusions;

(3) the likelihood of preform shattering is substantially reduced as compared to other known techniques;

(4) the enclosed reaction chamber facilitates the exclusion of unwanted contaminants, especially hydrogen and hydroxl compounds, thereby reducing undesirable optical absorption in the core and cladding; and (5) the process readily lends itself to the continuous fabrication of long optical fibers.

Our invention is also well-suited to the manufacture of high-strength optical preforms and optical fibers by inside deposition techniques. There are, of course, several inside deposition techniques which may be used to manufacture optical fibers including the chemical vapor deposition (CVD) technique and its several variations. Examples of various CVD techniques may be found in U.S. Pat. Nos. 3,982,916; 4,009,014; and U.S. application Ser. No. 704,146 filed July 12, 1976.

Very briefly, the CVD techniques employed in the typical inside deposition process are as follows: a hollow tubular natural or synthetic silica substrate is suitably supported, as on a glass lathe, and after the interior surface of the substrate is fire-polished, the glass constituents of the various layers are sequentially admitted into the heated substrate, in the form of halide vapors. When a substance such as silicon tetrachloride is entrained in oxygen and the mixture is introduced into the hollow substrate, with sufficient heat applied, a layer consisting essentially of pure silica will be deposited within the bore. In the structure illustrated in FIG. 12, the substrate layer is represented at 34 and the deposited silica layer at 33. Since they may both be composed of silica in this example, they are represented as being separated only by a dashed circle. For production and cost reasons, the substrate tube 34 may normally be of lower quality than the thinner deposited layer 33, so the latter serves as an ion barrier layer to reduce contamination of the cladding layer next to be deposited. The thickness of the ion barrier layer 33 is readily controlled by well-known techniques including adjustment of the mixture, control of the relative movement of the substrate, and regulation of the localized heat applied.

Figure 12:
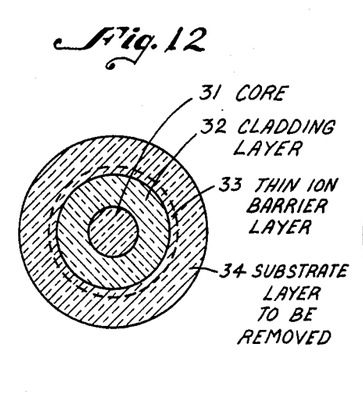
FIGS. 12 and 13 are cross-section views, not necessarily to scale, of two types of optical preforms prepared by chemical vapor deposition techniques within hollow tubular substates, illustrating further principles of the invention.

The next layer to be deposited is that which will form the cladding layer 32 in FIG. 12. When boron trichloride and silicon tetrachloride are entrained in oxygen, a layer of borosilicate glass can be deposited for this purpose. Finally, a third annular layer of germania silicate glass may be deposited that will eventually form the core 31 in FIG. 12. For this purpose the injected chemical vapors may contain germanium tetrachloride and silicon tetrachloride vapors in oxygen, possibly with some additional $POCl_3$ vapor.

The final process step is to apply increased heat to the tubular substrate and its concentric inner layers sufficient to cause collapse under surface tension into a solid preform of smaller outer diameter. This is now the structure represented in FIG. 12. However, further processing to remove most or all of the original substrate 34 is required in order to form the improved high-tensile-strength preform of our invention, as will shortly be described.

The interior CVD method of fabrication just described avoids losses due to absorption and contamination otherwise likely to occur due to hydroxyl compounds and transitional metal impurities. Various suitable heat sources for use in this method are known to the art, such as oxy-hydrogen flames, plasma torches, and high-power $CO_2$ lasers; hence are not shown in detail. The process controls are similar to those described above with respect to the external deposition process of FIG. 11. It is important that the several glassy deposited layers be uniform in radius and in layer thickness. In an optical preform having the structure shown in FIG. 12, the layer radii and thicknesses are exemplary and not necessarily to scale, but when drawn out into an optical fiber, the outer layer is usually much thinner than in the type of fiber having the structure illustrated in FIG. 3. Typically, in a 125-micron fiber produced by this inside deposition process, the outer layer may be of the order of 25 microns in thickness. As previously indicated in the descriptions of fibers having the structures of FIGS. 3 and 4, the outer layer must be much thinner to achieve the high-compression forces characteristic of the improved fibers of our invention, e.g., of the order of 1 to 10 microns in thickness, preferably in the range of 1 to 5 microns. This is true even though all the other important parameters have been carefully selected, including coefficients of expansion and transition temperatures, as previously described. Hence the need for further processing of the preform before the fiber-drawing process, as will shortly be described.

A similar problem exists in the fabrication of a four-layer preform by this inside CVD process. This is illustrated by the structure shown in FIG. 13 which shows a collapsed preform or resultant fiber having the same layers as shown in FIG. 12 but with an intermediate layer 35. Except for the substantially greater thickness of the outer layer 33–34 in FIG. 13, this structure corresponds generally to that shown in FIG. 4. Again, even though the layer materials and physical parameters have been carefully proportioned in accordance with the foregoing principles, the thickness of the outer layer 33–34 must be reduced to obtain the full benefits of our invention.

Figure 13:
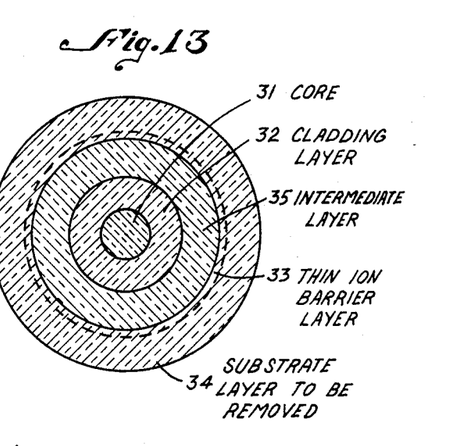

The objective in further processing of completed preforms having the structure shown in FIG. 12 or in FIG. 13 is to remove most, and preferably nearly all, of the original substrate layer 34, leaving only the thin ion-barrier silica layer 33 to provide the high-compression outer layer. There are several additional method steps which may be employed to accomplish this, as will now be described with reference to FIGS. 14A and 14B.

Figure 14A:
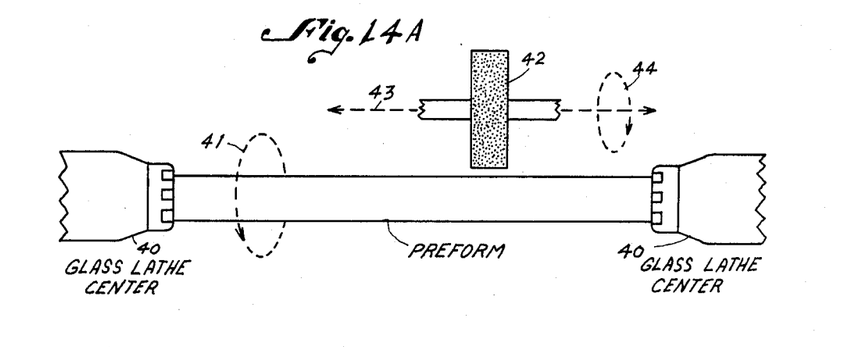
FIGS. 14A and 14B are schematic side elevation views showing certain manufacturing process steps which may be employed in making the preforms of FIGS. 12 and 13.

In the technique illustrated in FIG. 14A, the finished preform of FIG. 12 or FIG. 13 is mounted between the two centers 40 of a conventional glass lathe and carefully aligned. As the preform rotates, indicated schematically by the dashed circle 41, the excess material from the substrate layer 34, which is to be removed, is ground off by a precision grinding wheel 42 that is moved back and forth on an axis parallel to the preform axis as it rotates against the preform, indicated schematically at 43 and 44. After a desired thickness is removed, the preform is then cleaned and etched to remove any polishing compound. A good final preform surface finish can then be achieved by fire-polishing. In experimental preforms prepared by this grinding and polishing method, it has been observed that the compressive stress in the outer layer can be increased from a low starting value of a few kpsi. to a much higher compression of the order of 50 kpsi. or more.

In order for the thinning and finishing steps to be successfully carried out, as just described with reference to FIG. 14A, it is essential that the raw preform be carefully controlled during collapse to insure that the layers are concentric and that the preform is axially straight. If substantially all the original substrate 34 can be removed, the very thin ion-barrier layer 33, which was previously fused into it, effectively becomes the high-compression outer silica layer. This technique also substantially eliminates bulk flaws which may originate in the substrate tube.

Figure 14B:
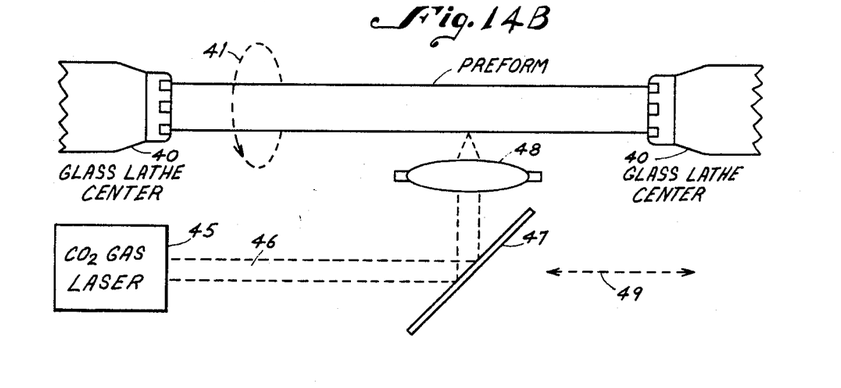

An alternate method for removing the unwanted substrate layer 34 is illustrated schematically in FIG. 14B. After the raw preform is mounted properly in the glass lathe as before, a high-power $CO_2$ gas laser 45 may be employed to mill off the unwanted substrate material. As is schematically indicated in FIG. 14B, the laser beam 46 may conventionally be reflected by a metal mirror 47 and focussed by a germania lens 48. The beam is also caused to scan back and forth along an axis parallel to the axis of the rotating preform by any suitable means, not shown but indicated by the dashed arrow 49. The precise adjustments required for laser milling are known in the art and need no further detailed description.

When the techniques of FIG. 14A or FIG. 14B are applied to the preform of FIG. 13, it has been found experimentally that the surface compression can be increased to a value of 100 kpsi. It is also theoretically possible to obtain even higher compressive forces in the preform surface. As is well-known in the art, these compressive stresses can be maintained when the preform is later drawn out into the finished composite optical fiber and plastic-coated.

Combinations of the techniques of FIGS. 14A and 14B may of course be utilized, as well as chemical etching to assist in initial removal of the substrate 34 material, with the objective of removing the unwanted material as precisely and rapidly as possible.

Thus, we have shown how high-quality optical preforms and fibers can be produced, which have significantly higher tensile strengths and extended fiber lives, by several alternative methods, provided that careful attention is also paid to glass compositions and dopants, relative coefficients of thermal expansion, and glass transition temperatures.

In the three-layer structure of FIG. 3 and in the finished structure made from the structure of FIG. 12, the important physical relationships are these:

(1) These glass compositions utilized for the inner core and cladding layer, which together comprise the inner portion of the preform or fiber, must have high coefficients of thermal expansion and relatively low transition temperatures.

(2) They must additionally include dopants which are chosen to provide the desired optical characteristics for the core and cladding, i.e., a lower optical index of refraction for the cladding than that for the core. In other words, the relative refractive indices must enable the required numerical aperture and acceptable optical scattering losses to be realized in the resulting fiber.

(3) Fortunately, as we have demonstrated, the above requirements are not incompatible. Solely by way of example, the core might consist of a 20% $GeO_2$ doped silica glass, while the cladding layer might consist of a 4% $B_2O_3$ doped silica glass or, alternatively, a borosilicate layer containing 40% $GeO_2$ and 15% $B_2O_3$. Such core compositions will have a weighted coefficient of thermal expansion substantially higher than that of pure silica, e.g., from one or two orders of magnitude higher. They will also have a substantially lower transition temperature $T_g$, e.g., in the range of 600° to 725° C. as compared to about 1200° C. for pure silica.

(4) The outer compression layer, being of substantially pure silica, has a relatively low coefficient of thermal expansion and a much higher $T_g$, as required.

In the four-layer structure of FIG. 4 and in the finished structure made from the structure of FIG. 13, the important physical relationships are essentially the same as summarized in the preceding paragraph for the three-layer structure, plus these:

(5) The additional layer 14 of FIG. 4 or layer 35 of FIG. 13 should have a relatively high coefficient of thermal expansion and a relatively low transition temperature $T_g$. By way of example, a 40% $GeO_2/SiO_2$ glass might be used for this layer. Other mixtures of $GeO_2$, $B_2O_3$, and $SiO_2$ can also be employed to achieve these desired physical parameters.

(6) The transition temperature $T_g$ of the high-expansion intermediate layer is not critical, but there is a practical limit to lowering its $T_g$. The melting points of the three inner layers must not be so low as to cause premature preform deformation during collapse. In practice, this will limit the permissible percentage of $B_2O_3$ in any borosilicate layer to less than 50%.

The relative thicknesses of the core, cladding, and any intermediate layer are not critical so long as optical requirements are met. For example, in one illustrative fiber, the layer radii might be about 25, 30, and 59 microns for the core, cladding, and intermediate layer, respectively. With an outer silica compression layer of between 1 and 5 microns in thickness, surface compressions of the order of 50 to 100 kpsi. should be obtainable in accordance with our invention.

The thickness of the cladding layer can also be increased without significantly altering the optical propagation characteristics. This is advantageous in our invention in that it increases the radius of the high-expansion low-$T_g$ region of the fiber, and will therefore increase the surface compression for a given thickness of the low-expansion high-$T_g$ region. Depending on the type of optical transmission desired, the cladding layer may have a thickness up to 20 or 30 microns in the finished fiber.

While we have disclosed various preform and fiber structures and various exemplary techniques and processes providing high compressive stresses for greater strength, durability, and fiber life, it will be apparent to those skilled in the art that other alternatives and embodiments may be employed without departing from the scope of our invention as set forth in the appended claims.

We claim:

1. An optical light-transmitting structure having high tensile strength comprising:

a solid cylindrical core of a first doped silica material;

a concentric cladding layer of a second doped silica material surrounding said core;

said core and layer materials being selected for good optical transmission characteristics and also for a relatively high average coefficient of thermal expansion and a relatively low average glass transition temperature; and at least one additional concentric layer of a silica material surrounding said cladding layer;

the outermost layer being substantially thinner than the enclosed layers and consisting of a silica material having a relatively low coefficient of thermal expansion and a relatively high glass transition temperature as compared to those of the layer which it encloses.

2. The optical light-transmitting structure of claim 1 wherein:

said core material is a silicate glass primarily doped with $GeO_2$ or $P_2O_5$;

said cladding layer is a silicate glass primarily doped with boron; and said outermost layer is a fused silica glass.

3. The optical light-transmitting structure of claim 2 wherein:

said core, cladding, and any intermediate layer have a weighted average coefficient of thermal expansion an order of magnitude or two orders of magnitude higher than that of the outermost layer, and a weighted average glass transition temperature of the order of 600° to 725° C.; and wherein said outermost silica layer has a glass transition temperature of the order of 1200° C.

4. A multilayer optical structure having increased tensile strength, greater durability, and longer life, comprising:

an inner cylindrical core of a first glass composition; and a multilayer cylindrical structure surrounding said core structure consisting of cylindrical layers fused together including an inner cladding layer of a second glass composition fused to said core and an outermost layer of a third glass composition;

said outermost layer having a substantially lower coefficient of thermal expansion and a substantially higher glass transition temperature than the coefficient of thermal expansion and glass transition temperature, respectively, of the next-to-outer layer that is fused to said outermost layer.

5. The multilayer optical structure of claim 4 wherein:

said outermost layer has substantially less radial thickness than the thicknesses of the other layers which it surrounds;

whereby said optical structure is subject to a high surface compressive stress in said outermost layer.

6. The multilayer optical structure of claim 5 wherein:
said core and any layer surrounded by said outermost layer have a combined radial thickness at least 10 times the radial thickness of said outermost layer.

7. The multilayer optical structure of claim 5 wherein:
said first glass composition is a silicate glass primarily doped with $GeO_2$ or $P_2O_5$;
said second glass composition is a silicate glass primarily doped with boron; and
said third glass composition is a fused silica glass.

8. The multilayer optical structure of claim 7 wherein:
said core, cladding layer, and any intermediate layer have a weighted average coefficient of thermal expansion from one or two orders of magnitude higher than that of the outermost layer, and a weighted average glass transition temperature of the order of 600° to 725° C.; and wherein
said outermost layer has a glass transition temperature of the order of 1200° C.

9. An optical preform comprising:
an elongated core of a first doped silica glass;
a cladding layer of a second doped silica glass surrounding said core;
said core and cladding glasses being selected for good optical transmission characteristics and also for relatively high coefficients of thermal expansion and relatively low glass transition temperatures; and
one or more additional layers of glass surrounding said cladding layer, the outermost layer being relatively thin as compared to the thicknesses of interior layers and being composed of a silica glass having a substantially lower coefficient of thermal expansion and a substantially higher glass transition temperature than those of the core and interior layers;
whereby the outer surface of said preform is under high compressive stress and may be drawn into a long optical fiber of substantially increased tensile strength and durability.

10. The optical preform of claim 9 wherein said core is surrounded by two layers and wherein:
the core consists of a silica glass primarily doped with $GeO_2$ or $P_2O_5$,
the first cladding layer consists of a silica glass primarily doped with boron or a germanium-boron mixture, and
the second high-compression layer consists of an undoped fused silica glass.

11. The optical preform of claim 9 wherein:
the outermost layer is a titanium silicate glass having a negative coefficient of thermal expansion.

12. In an optical communication fiber structure having high tensile strength, durability, and fiber life, of the type having a first layer of glass core material having a first optical index of refraction and a second layer of cladding glass material surrounding said core layer and having a second optical index of refraction lower than that of said core layer, said layers forming an inner portion of said fiber structure having efficient light-transmission characteristics and a first average coefficient of thermal expansion and a first average glass transition temperature, the improvement comprising:
a third relatively-thin layer of glass material surrounding said second layer and having a second coefficient of thermal expansion substantially lower than that of said inner portion and also having a second glass transition temperature substantially higher than that of said inner portion;
whereby said third layer exerts a high compressive force on said second layer.

13. The optical communication fiber structure of claim 12 wherein:
said inner portion has a radial thickness at least 10 times that of said third layer.

14. The optical communication fiber structure of claim 13 wherein:
said third layer has a radial thickness of between 1 and 10 microns.

15. An optical preform comprising:
an elongated core of a silica glass primarily doped with a material selected from the group of $GeO_2$ and $P_2O_5$;
a cladding layer of a silica glass primarily doped with a material selected from the group of boron and a germanium-boron mixture surrounding said core;
an intermediate layer consisting of a silica glass primarily doped with a material selected from the group of germanium and a germanium-boron mixture, proportioned to have a relatively high coefficient of thermal expansion and a relatively low glass transition temperature, and
an outermost high-compression layer consisting of an undoped fused silica glass;
said core and cladding layers being selected for good optical transmission characteristics and having relatively high coefficient of thermal expansion and a relatively low glass transition temperature; and
the outermost high-compression layer being relatively thin as compared to the thicknesses of the interior layers and being composed of a silica glass having a substantially lower coefficient of thermal expansion and a substantially higher glass transition temperature than those of the core and interior layers; and
whereby the outer surface of said preform is under high compressive stress and may be drawn into a long optical fiber of substantially increased tensile strength and durability.

16. In an optical communication fiber structure having high tensile strength, durability, and fiber life, of the type having a first layer of glass core material having a first optical index of refraction and a second layer of cladding glass material surrounding said core layer and having a second optical index of refraction lower than that of said core layer, said layers providing efficient light-transmission characteristics, the improvement comprising:
a third expansion layer of glass material surrounding said second layer, said three layers forming an inner portion having a first average coefficient of thermal expansion and a first average glass transition temperature; and
a fourth compression layer of glass material surrounding said third layer and having a second coefficient of thermal expansion substantially lower than that of said inner portion and a second glass transition temperature substantially higher than that of said inner portion;
said fourth layer having substantially less radial thickness than the individual thicknesses of said first, second, and third enclosed layers;

whereby said fourth layer exerts a high compressive force on said third layer.

17. The optical communication fiber structure of claim 16 wherein:

said inner portion has a radial thickness exceeding 10 times that of said fourth layer, and
said fourth layer has a radial thickness of between 1 and 10 microns.

* * * * *